United States Patent [19]

Scharnberg et al.

[11] Patent Number: 5,721,836

[45] Date of Patent: Feb. 24, 1998

[54] METHOD AND APPARATUS FOR SENSING AND CHANGING THE STATE OF A COMPUTER BEFORE CONNECTING THE COMPUTER TO OR DISCONNECTING THE COMPUTER FROM AN EXPANSION UNIT

[75] Inventors: Donald G. Scharnberg, Pasadena; Scott P. Saunders, Spring, both of Tex.

[73] Assignee: Compaq Computer Corporation, Houston, Tex.

[21] Appl. No.: 741,643

[22] Filed: Oct. 28, 1996

Related U.S. Application Data

[63] Continuation of Ser. No. 188,554, Jan. 27, 1994, abandoned.
[51] Int. Cl.[6] .................................................. G06F 13/14
[52] U.S. Cl. ............................................ 395/281; 395/750
[58] Field of Search ................................... 395/280, 281, 395/750

[56] References Cited

U.S. PATENT DOCUMENTS

| 5,313,596 | 5/1994  | Swindler et al. ............. | 395/325 |
| 5,323,291 | 6/1994  | Boyle et al. ................. | 361/683 |
| 5,377,357 | 12/1994 | Nishigaki et al. ............ | 395/800 |
| 5,394,552 | 2/1995  | Shirota ....................... | 395/750 |

OTHER PUBLICATIONS

Texas Instruments: "TravelMate DeskTop Intelligent Docking System" Brochure, 1993, pp. 2, 3.
"Portable Computing Gets a Makeover at Comdex," *Info World*, Nov. 8, 1993, v 15, n 45, as reprinted in Computer Select, Jul., 1994, p. 1.
"New Notebooks: TI Announces Notebooks with 75MHz Intel DX4 Processor; New . . . ," *Edge: Work-Group Computing Report*, Mar. 14, 1994, v 5, n 199, reprinted in Computer Select, Jul., 1994, p. 3.

"TravelMate Intelligent Docking System," *PC-Computing*, Apr., 1994, v. 7, n 4, reprinted in Computer Select, Jul., 1994.

Apple Computer, Inc., "PC Expo '94", pp. 31–32. Jun. 28, 1994.

"Little by little: ever-more-capable subnotebook computers may soon provide competition for products in all price and performance categories", Computer Letter, Sep. 20, 1993 v9 n31 p1 (6) as reprinted in Computer Select, Jul. 1994, pp. 4–5.

*Primary Examiner*—Jack B. Harvey
*Assistant Examiner*—Jeffrey K. Seto
*Attorney, Agent, or Firm*—L. Jon Lindsay

[57] ABSTRACT

A method and apparatus for sensing the state of a computer system and changing the state, if necessary, before connecting the computer system to a computer expansion unit. The computer system has an electrical sense pad on which it sets a state signal. This state signal can indicate one of several states of the computer system. When the computer system is placed in the computer expansion unit, the expansion unit detects the state signal from the electrical sense pad and determines the state of the computer therefrom. If the determined state is an acceptable state, then the expansion unit will complete the connection of the computer to itself. If the determined state is an unacceptable state, then the expansion unit will delay completion of the connection and will send a signal back to the computer system telling the computer system to change its state. When the computer system receives this signal, it will change its state to an acceptable state and then reset the state signal on the electrical sense pad to indicate the new state.

36 Claims, 4 Drawing Sheets

METHOD AND APPARATUS FOR SENSING AND CHANGING THE STATE OF A COMPUTER BEFORE CONNECTING THE COMPUTER TO OR DISCONNECTING THE COMPUTER FROM AN EXPANSION UNIT

This is a continuation of application Ser. No. 08/188,554, filed on Jan. 27, 1994, now abandoned.

BACKGROUND OF THE INVENTION

This invention relates to computer systems having expansion units, and more particularly relates to the connection of the computer system to the expansion unit and the communication between the computer system and the expansion unit during the connection and disconnection of the computer system to the expansion unit.

Notebook personal computers have been commonplace for many years now. These computers are different from desktop personal computers because they are designed to be very small and lightweight so they can be taken wherever the user needs to go. In the user's primary office, however, he or she may use a desktop computer to perform work because desktop computers may be equipped with many extra features that expand the capabilities of the desktop computer. Such features include network connectors, extra hard drives, extra floppy drives, large monitors, ISA expansion cards, and other peripheral devices. A notebook computer is capable of having connectors available for some of these features in side panels of its housing. Due to its size, however, the notebook computer is severely limited in the types of features that can be connected to it. Thus, many of the features available to desktop computers are not available to a stand-alone notebook computer.

To solve this problem of expandability, many notebook computer manufacturers have created convenience bases or expansion units to which the notebook computer could be attached. These expansion units generally include a special connector through which the notebook computer communicates with the features within the expansion unit. The expansion unit further includes additional connectors for attaching to external devices such as a CRT monitor, a keyboard, or a network.

Notebook computers may have connectors for some of these external devices, but every time the user wishes to attach the notebook to these devices he or she must attach each device individually. Thus, it becomes very cumbersome to attach the notebook computer to these devices every time the user needs them. An expansion base unit solves this problem by providing only one connector to which the notebook computer needs to be attached. All of the external devices are then conveniently accessible through the base.

The notebook computer is usually attached to the expansion base by pushing the computer onto the connector on the base. To remove the computer from the base, the user typically must either pull on the computer itself or push an eject button or lever which pops the computer off of the connector.

Another means to connect the computer to the base is by the use of a motor assembly which grips the computer and pulls the computer into position and attaches it to the connector. With the motor assembly method, the user cannot push the computer onto the connector. Instead, the user merely holds the computer in place until the motor assembly takes over the connecting step. Thus, the user is not able to damage the connectors, since the motor assembly is designed to very carefully align the connectors on the base with the connectors on the computer.

Expansion bases and notebooks require the notebook computers to be in a particular state, usually "off," before the computer can be properly inserted into the base. For an expansion base that does not have a motor assembly to perform the connection step, there is no means to prevent insertion of the computer when the computer is in a wrong state. Instead, the expansion base merely will not communicate with the computer when the computer is connected while in an improper state or will cause the notebook to reboot causing potential data loss. For an expansion base with a motor assembly, since the user cannot push the computer into connection with the base, the base can refuse to complete the connection if it detects that the computer is in a wrong state.

For an expansion base that can refuse to complete connection of the computer, the user is prompted to put the computer in the proper state by the fact that the base has refused to accept the computer. Thus, an extra step is added to the user's routine of inserting the computer into the base. This extra step can be very annoying to a user who is in a hurry, or simply frequently forgets to put the computer in the proper state. Therefore, a necessity has arisen for a computer system and expansion base unit that will communicate with each other to cause the computer system to automatically put itself in a proper state before the connection is made between them.

Additionally, the same problems are encountered when the user wants to disconnect the computer system from the expansion unit. If the computer is manually ejected from the expansion unit while the computer system is still on and running, it will suddenly lose the devices that were connected through the expansion unit, and potentially lose data. The notebook computer may even suddenly reboot, losing data in the process. The computer system will then have to be completely reconfigured by the user. For a motor assembly operated expansion unit, the same problem will occur if the expansion unit does not have the ability to refuse to eject the computer system until after the computer system has been put in a proper state for ejection. Still, the user must perform an extra step to put the computer system in a proper state. Therefore, a need has arisen for a computer system and expansion unit which can communicate between themselves to make the computer system automatically put itself into a proper state for ejection whenever the user needs to disconnect the computer.

SUMMARY OF THE INVENTION

A computer system and expansion base unit using the present invention will change the state of the computer before electrical connection or disconnection is completed with the base. The computer system has an electrical sense pad exposed on its outer surface. The base unit can make electrical contact with this electrical sense pad in order to receive information regarding the state of the computer before electrical connection is made between the computer and base and before the computer is disconnected from the base. Before connection, the computer must put a signal on the electrical sense pad indicative of its state every time it changes state. In this manner, it will always be ready to communicate with a base, since it has no way to determine when it is about to be connected to the base. When connection is attempted, the base unit can detect the signal on the sense pad, and the base can determine the current state of the computer. If the base determines that the computer is in a proper state, then it will complete the electrical connection with the computer. If the base unit determines that the computer is not in a proper state, then it can send a signal back to the computer indicating a desire to connect the computer to the base. When the computer detects the signal sent back to the computer, the computer will initiate a sequence to put itself into a proper state for connection and then set a new signal on the electrical sense pad indicative of the new state. When the base unit detects the new signal and determines that the computer is in a proper state, it will complete the electrical connection between the computer and the base unit.

There can be more than one proper state of the computer for connection with the base unit, and there can be more than one improper state for connection. If the computer is in a power-off state, then connection to the base is always permitted. If the computer is in a standby or sleep state, then connection to the base is permitted, but only if the electrical connector has presented a signal indicative of this state long enough for the computer to make sure that it has indeed gone into the standby state. If the computer is in a power-on state and is running, then connection to the base is not permitted unless the computer can put itself into a standby or off state. If the computer cannot put itself into a standby or off state within a certain time period, then the base must not permit connection at all.

After the computer has been connected to the expansion base unit, the computer may return to the state it was in prior to the connection.

Likewise, when the user desires to eject the computer system, the expansion base unit can check the sense pads to determine if the computer system is in a proper state for disconnection. If the computer is in an off or standby state, then the expansion unit can complete the disconnection. If the computer is on and running, then the expansion unit can generate a request to the computer system to put itself into standby or other appropriate state for disconnection. If the computer is in a state in which it can never be ejected, then the expansion base can emit a beep and refuse to complete the disconnection. The user will then have to put the computer in a proper state.

This invention is ideal for use with an expansion base unit that has a motor assembly to automatically make the connection with the base, but it is capable of working with a base unit that does not have such a motor assembly.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
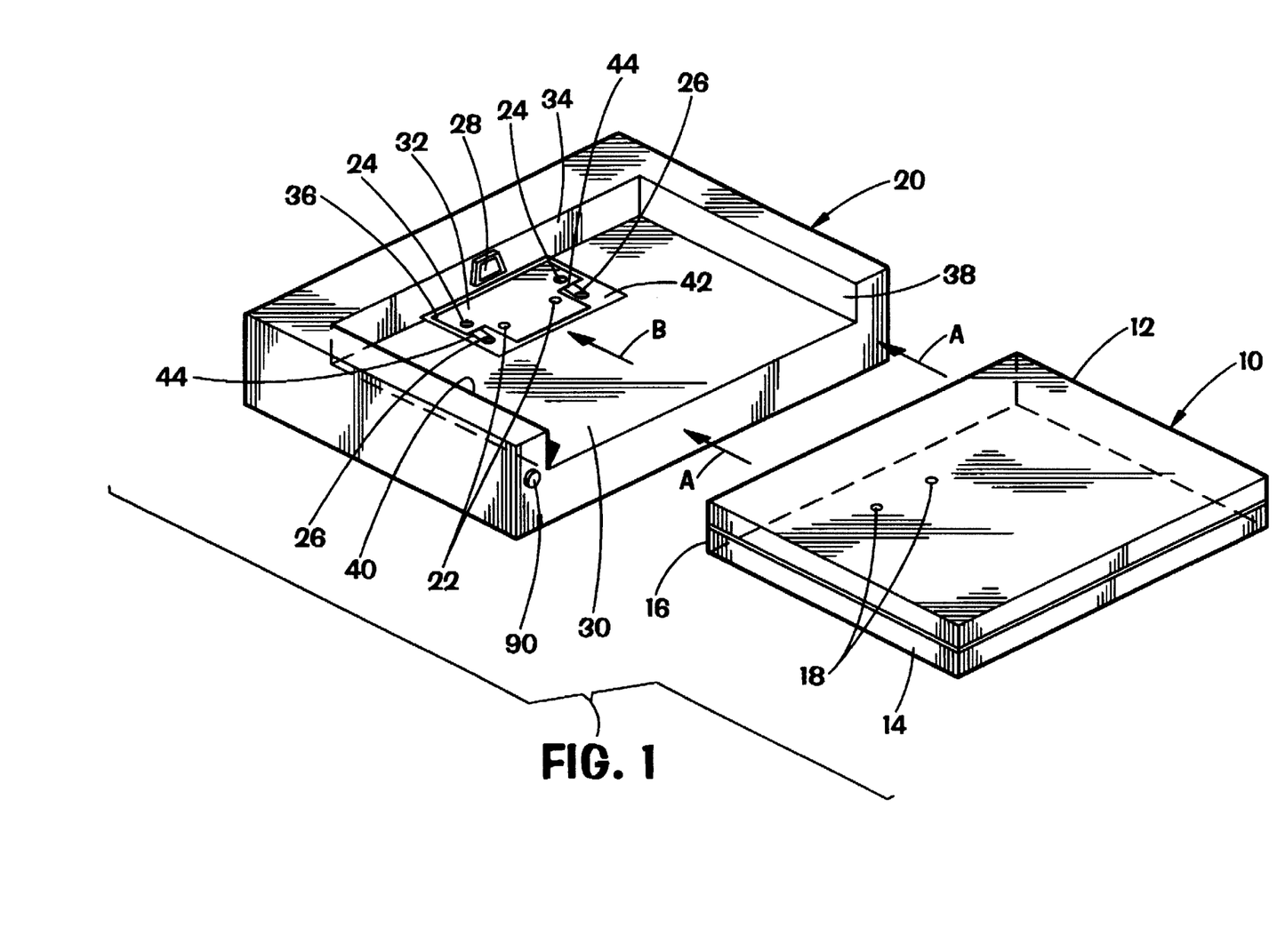
FIG. 1 is a drawing of a computer system and an expansion base unit incorporating the present invention.

A computer system 10 and an expansion unit 20 incorporating the present invention are shown in FIG. 1. The computer system 10 inserts into the expansion unit 20 in the direction of arrows A. Computer system 10 has a top surface 12, a bottom surface 14 and a rear surface 16. Computer system 10 has two electrical sense pads 18 inserted into the bottom surface 14.

Expansion base 20 has a computer containment area defined by floor surface 30, right wall 38, left wall 40, and rear wall 34. Rear wall 34 has expansion port connector 28 protruding therefrom. Rear wall 34 also has opening 36 near floor surface 30. Floor surface 30 has a depressed area 42 into which computer control plate 32 sits such that the top surface of control plate 32 is substantially flush with floor surface 30. Control Plate 32 has two electrical sense pads 22 which correspond to electrical sense pads 18 on computer system 10. Control plate 32 also has blocks 24. Grab hooks 26 are rotatably connected to control plate 32 by hinges 44. Control plate 32 slides in the direction of arrow B into opening 36. Expansion base unit 20 also has an eject button 90.

When computer 10 is inserted into expansion unit 20, it slides into the computer containment area until it is pressed up against blocks 24. Blocks 24 stop the computer 10 in a position such that electrical sense pads 18 on computer 10 align with and contact electrical sense pads 22 on expansion unit 20. Electrical contact is thus made between computer 10 and expansion unit 20 so that computer 10 can send expansion unit 20 a state signal indicating the state of computer 10.

A motor assembly 70 (FIG. 2) inside expansion unit 20 pulls control plate 32 into expansion unit 20 in the direction of arrow B. When control plate 32 slides into expansion unit 20, grab hooks 26 rotate up to grab computer 10. When grab hooks 26 grab computer 10, they pull computer 10 into electrical connection with expansion port connector 28. Grab hooks 26 also hold computer 10 in position such that electrical sense pads 18 on computer 10 are in electrical contact with electrical sense pads 22 on expansion unit 20 while computer system 10 is connected to expansion unit 20.

Motor assembly 70 can push computer system 10 back out of expansion unit 20. Blocks 24 push against computer system 10 during this operation.

Figure 2:
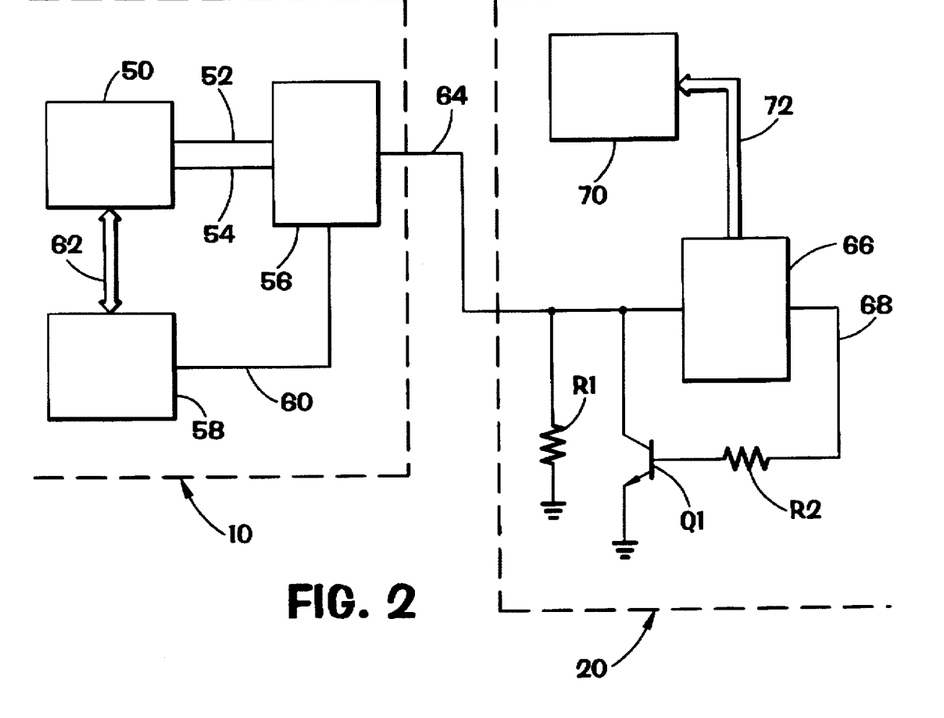
FIG. 2 is a block diagram of a computer system and an expansion unit.

FIG. 2 is a block diagram of a computer system 10 and an expansion unit 20 according to the present invention. Computer system 10 contains special ASIC 50. ASIC 50 communicates across control lines 52 and 54 with computer sense docking circuit 56. Computer sense docking circuit 56 communicates with SMI handler 58 across docsmi# line 60. SMI handler 58 communicates with ASIC 50 across control lines 62.

Computer sense docking circuit 56 communicates with expansion unit 20 across computer sense line 64. Computer sense line 64 forms the connection between computer 10 and expansion unit 20 when electrical sense pads 18 and 22 (FIG. 1) are in electrical contact. Electrical sense pads 18 and 22 have two connectors each because one is needed to form a ground, or reference, line. Computer sense line 64 connects to microcontroller 66 in expansion unit 20. Computer sense line 64 is connected to ground through resistor R1. Microcontroller 66 outputs control line 68 through resistor R2 to the base of transistor Q1. The emitter of transistor Q1 connects to ground, and the collector of transistor Q1 connects to computer sense line 64. Microcontroller 66 also connects to motor assembly 70 across control lines 72.

Figure 3:
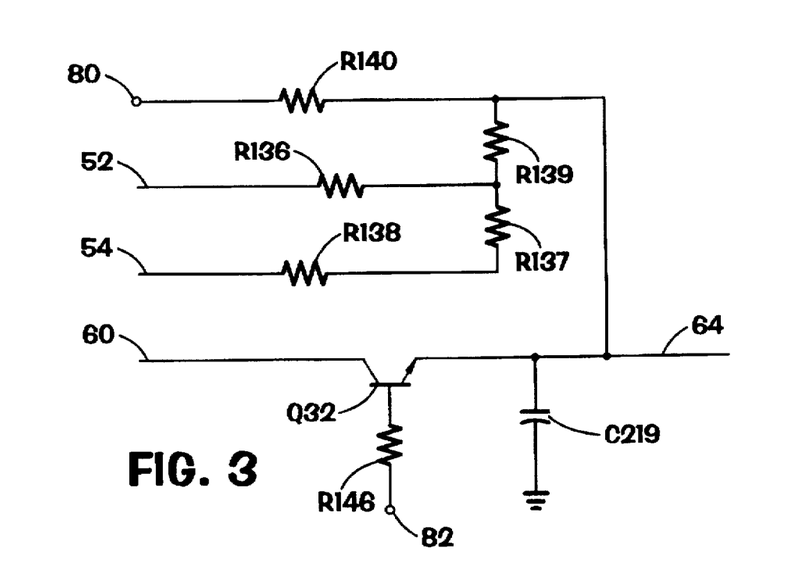
FIG. 3 is a circuit diagram of a circuit to provide an electrical signal indicative of the state of the computer system and to receive a signal indicative of a desire to connect the computer to the base unit.

FIG. 3 shows a schematic diagram of the computer sense docking circuit 56 of FIG. 2. Control line 52 connects through resistors R136 and R139 to computer sense line 64.

Control line 54 connects through resistors R138, R137 and R139 to computer sense line 64. Voltage source 80 connects through resistor R140 to computer sense line 64. In the preferred embodiment, voltage source 80 is +5 volts. The emitter of transistor Q32 is connected to computer sense line 64 and across capacitor C219 to ground. The base of transistor Q32 is connected through resistor R146 to voltage source 82. In the preferred embodiment, voltage source 82 is +3.3 volts. The collector of Q32 is connected to docsmi# line 60.

ASIC 50 generates control signals on control lines 52 and 54. These control signals indicate the state of the computer system 10. Computer sense docking circuit 56 converts the control signals from control lines 52 and 54 into a state signal and sends this state signal to expansion unit 20 over computer sense line 64. The state signal is indicative of the state of computer system 10.

In the preferred embodiment, computer system 10 can be in one of four states. First, computer system 10 can be in an "off" state in which power to computer system 10 is turned off, and in which it is always acceptable to connect computer system 10 to or disconnect computer system 10 from expansion unit 20. Second, computer system 10 can be in a standby, or sleep, state in which computer system 10 is not completely powered off, but in which parts of computer system 10 have been shut down to conserve power in such a manner that computer system 10 can quickly return to its "on" state. In the standby state, it is okay to connect computer system 10 to or disconnect computer system 10 from expansion unit 20, but only after waiting for a prescribed period of time before making the connection or disconnection in order to be sure that computer system 10 has had time to actually enter the standby state. Thus, the standby state may also be called the okay-to-connect, wait-to-connect, okay-to-disconnect or wait-to-disconnect state. Third, computer system 10 may be in a state in which it is not permitted to connect computer system 10 to or disconnect it from expansion unit 20, but computer system 10 will consider putting itself into a state in which connection or disconnection is allowed. In this state, denial of the connection or disconnection is conditional. Thus, this state may also be called a conditional-connection-denied or conditional-disconnection-denied state. In this state, computer system 10 is usually "on" and may be running a program. If computer system 10 can put itself into its standby state, then connection to or disconnection from expansion unit 20 will be permitted. Fourth, computer system 10 may be in the middle of an application from which it cannot exercise the feature of putting itself into a state acceptable for connection to or disconnection from expansion base 20, or computer system 10 may be using an operating system that does not even support this feature, or computer system 10 may not even support this feature. If computer system 10 is running an application from which it cannot exit to put itself into an acceptable state, then it will still attempt to put itself into an acceptable state, but it will fail. Upon a failed attempt to enter an acceptable state, computer system 10 will temporarily enter a state, called connection-denied or disconnection-denied, in which it is never okay to connect to or disconnect from expansion base 20, thus indicating that connection or disconnection is denied. If computer system 10 is running under an operating system that does not support the above feature, then computer system 10 will enter and stay in the connection-denied or disconnection-denied state.

If computer system 10 is in the off, or always-connect or always-disconnect, state, then no power will be provided to computer sense docking circuit 56. The state signal on computer sense line 64 will then be 0 volts.

In the preferred embodiment, if computer system 10 is in the connection-denied or disconnection denied state, then control lines 52 and 54 are both held near zero volts, so there is a large voltage drop across the resistors R140, R139, R138, R137, R136 from voltage source 80 to control lines 52 and 54. In this situation, a low voltage state signal will be presented on computer sense line 64. In the preferred embodiment, this state signal is between +2.5 and +3.5 volts.

In the preferred embodiment, if computer system 10 is in the okay-to-connect, wait-to-connect, okay-to-disconnect or wait-to-disconnect state, then control lines 52 and 54 are held high, near +5 volts. Thus, there is virtually no voltage drop from voltage source 80 to control lines 52 and 54, so a high voltage state signal will be presented on computer sense line 64. In the preferred embodiment, this state signal is above +4.5 volts.

If there is a low voltage (near zero) on one of the control lines 52 and 54, and a high voltage (near +5 volts) on the other line, then there will be a medium voltage drop from voltage source 80 to control lines 52 and 54. Thus, a medium voltage state signal will be presented on computer sense line 64. In the preferred embodiment, this state signal is between +3.5 and +4.5 volts. It is possible to choose the resistance of resistors R136, R137 and R138 such that two different voltage signals can be presented on computer sense line 64, depending on which control line 52 or 54 has the low voltage and which has the high voltage. Thus, it is possible to provide an extra state signal. In the preferred embodiment, however, this extra state signal is not needed, because any voltage drop between +3.5 and +4.5 volts will indicate that computer system 10 is in the okay-to-connect/wait-to-connect/okay-to-disconnect/wait-to-disconnect state.

As long as the voltage on computer sense line 64 is above a minimum value, transistor Q32 will always be off, so no signal will be presented on docsmi# line 60. The voltage level for any of the states described above, except for the off/always-connect/always-disconnect state, is above this minimum value. Thus, transistor Q32 will always be off unless expansion unit 20 drives computer sense line 64 low. If expansion unit 20 drives computer sense line 64 low, then transistor Q32 will turn on and a low signal will be presented on docsmi# line 60.

Capacitor C219 is a shunt to ground to filter out any RF noise.

When connection is made between electrical sense pads 18 and 22, the voltage state signal on computer sense line 64 is presented across resistor R1. Microcontroller 66 (FIG. 2) of expansion unit 20 contains an analog-to-digital converter (not shown) for decoding the state signal from computer sense line 64.

When microcontroller 66 determines that computer system 10 is in the off/always-connect/always-disconnect state, then microcontroller 66 sends control signals on control lines 72 to motor assembly 70 to cause motor assembly 70 to turn on and pull computer system 10 into connection with expansion port connector 28 if connection is requested. If disconnection is requested, then microcontroller 66 sends control signals on control lines 72 to motor assembly 70 to cause motor assembly 70 to turn on and push computer system 10 out of connection with expansion port connector 28.

When microcontroller 66 determines that computer system 10 is in the okay-to-connect/wait-to-connect/okay-to-disconnect/wait-to-disconnect state, then microcontroller 66 waits for a period of time after connection or disconnection is requested. At the end of this time period, microcontroller 66 checks to verify that computer system 10 is still in this state and then sends control signals on control lines 72 to motor assembly 70 to cause motor assembly 70 to turn on and either pull computer system 10 into connection or push computer system 10 out of connection with expansion port connector 28.

Computer system 10 will have to present the okay-to-connect/wait-to-connect/okay-to-disconnect/wait-to-disconnect state signal on computer sense line 64 before actually entering this state, since it may not be able to change the state signal after entering this state. Therefore, the time period must be sufficiently long to make sure that computer system 10 has time to put itself into this state.

When microcontroller 66 determines that computer system 10 is in the connection-denied/disconnection-denied state, microcontroller 66 will not permit motor assembly 70 to operate and will send a signal to the user that connection or disconnection is denied. This signal to the user is usually an audible beep, but may be any other appropriate signal.

When microcontroller 66 determines that computer system 10 is in the conditional-connection-denied/conditional-disconnection-denied state, expansion unit 66 must send a control signal to computer system 10 to indicate the desire to connect computer system 10 to or disconnect it from expansion unit 20. To do this communication, microcontroller 66 briefly puts a control signal on control line 68 to turn on transistor Q1. When transistor Q1 is turned on, it sends computer sense line 64 to a very low signal, almost to ground. This low signal is below the minimum value to allow transistor Q32 to turn on. When transistor Q32 turns on, the low signal is supplied to docsmi# line 60. When a low signal is applied to docsmi# line 60, it sends an interrupt signal to SMI handler 58. SMI handler 58 determines the type of interrupt and sends a message to the computer system's 10 operating system that the configuration of computer system 10 is about to change. At about the same time, SMI handler 58 sets a timer in ASIC 50 for a period of time. If the operating system does not respond to the message before the timer times out, then ASIC 50 will generate an interrupt to SMI handler 58 and SMI handler 58 will withdraw the message to the operating system and cause the connection-denied/disconnection-denied state to be asserted on the electrical sense pads 18.

If the operating system recognizes the message sent by SMI handler 58, then the operating system will cause the BIOS to cancel the timer in ASIC 50. The operating system will then take as long as is necessary to put computer system 10 into the okay-to-connect/okay-to-disconnect state. The operating system should complete this task as quickly as possible since, during a connection procedure, the user is holding computer system 10 in expansion unit 20 during this entire time. If the user lets go of computer system 10, then the connection between electrical sense pads 18 and 22 will be lost and the entire process will have to be repeated from the beginning. When the operating system puts computer system 10 into the okay-to-connect/okay-to-disconnect state, it will then send a message to the BIOS to continue with the connection or disconnection procedure. If the operating system fails to put computer system 10 into the okay-to-connect/okay-to-disconnect state, then the operating system will send a message to the BIOS to abort the connection or disconnection procedure.

If the BIOS receives the abort message, then it will cause the connection-denied/disconnection-denied state to be briefly asserted on the electrical sense pads 18 and then to return to the conditional-connection-denied/conditional-disconnection-denied state.

If the BIOS receives the continue message, then the BIOS will generate an SMI via software to SMI handler 58. SMI handler 58 will enable a resume event to be generated by a timer within ASIC 50. The timer will be set for a period of time. In the preferred embodiment, this time period is 1.5 seconds. The SMI handler will then cause the okay-to-connect/okay-to-disconnect state to be asserted on electrical sense pads 18, and then put the unit in standby. Asserting the okay-to-connect/okay-to-disconnect state on electrical sense pads 18 must be done just before transitioning to standby because expansion unit 20 will operate the motor assembly 70 after seeing the okay-to-connect/okay-to-disconnect state for a small amount of time.

After the time period has timed out, the resume event is generated by the timer within ASIC 50. The resume event will wake computer system 10 out of its standby state. Computer system 10 will then return to the state it was in before the connection or disconnection procedure was begun.

Figure 4:
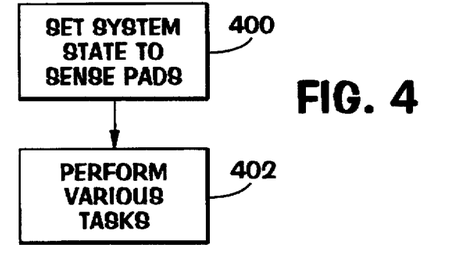
FIG. 4 is a flow chart of the normal operation of a computer system incorporating the present invention.

FIG. 4 is a flow chart of the normal operation of a computer system 10 incorporating the present invention. In such a computer system, at step 400, the computer system 10 must first set the electrical sense pads 18 to assert the state of the computer system 10. Then at step 402, the computer system 10 can go on to perform whatever tasks are required by the applications being run on the system.

Figure 5:
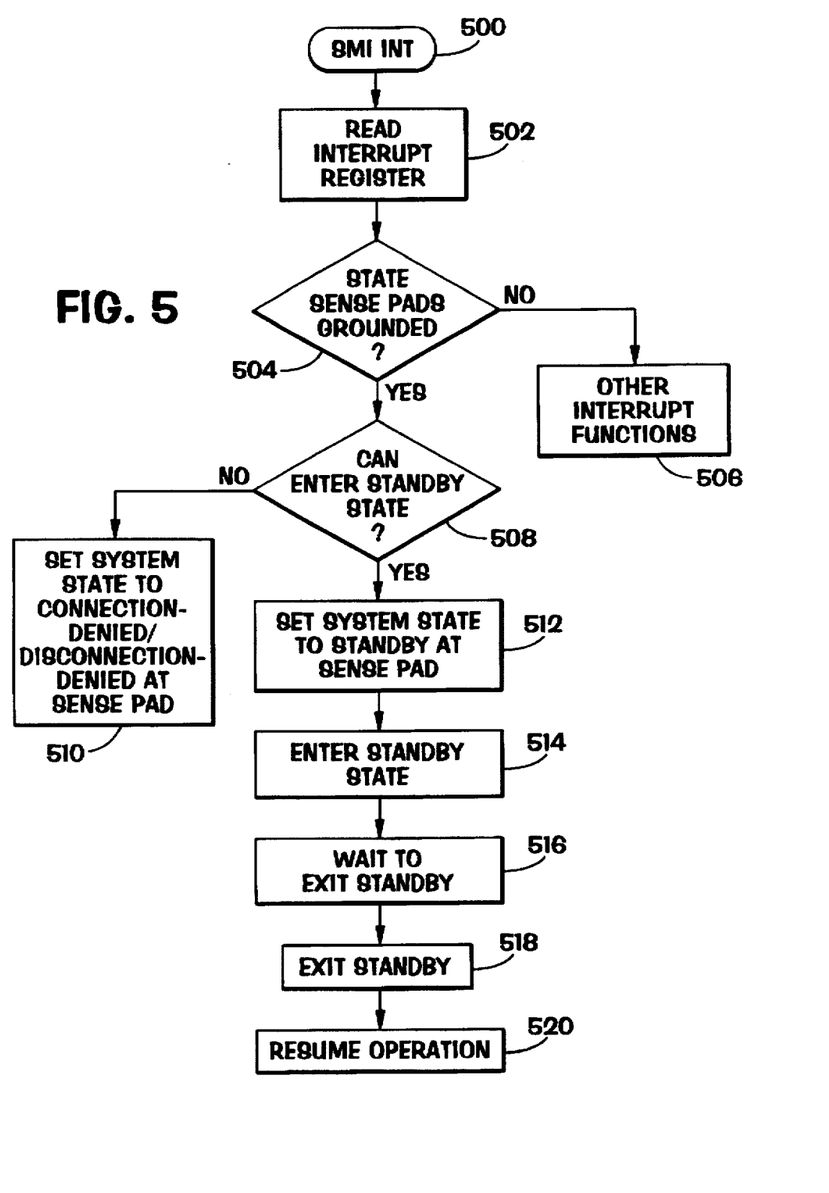
FIG. 5 is a flow chart of the sequence for a computer system to connect with an expansion base unit according to the present invention.

FIG. 5 is a flow chart of the procedure performed by computer system 10 to put itself into a proper state for connection to or disconnection from expansion unit 20. At step 500, SMI handler 58 receives an interrupt. At step 502, SMI handler 58 reads its interrupt register. At step 504, SMI handler 58 determines whether the interrupt originated from the docsmi# line 60, indicating that electrical sense pad 18 has been driven low by a control signal from expansion unit 20. If the interrupt did not originate from this source, then the system proceeds with other interrupt functions at step 506. If the interrupt, however, did originate from docsmi# line 60, then computer system 10 proceeds at step 508 to determine if it can enter the standby/okay-to-connect/okay-to-disconnect state. If it cannot enter this state, then the connection-denied/disconnection-denied state is set at electrical sense pads 18 in step 510. If the system can enter the standby state, then the okay-to-connect/okay-to-disconnect state is set at electrical sense pads 18 in step 512. At step 514, computer system 10 goes into its standby state. At step 516, computer system 10 waits for a period of time in the standby state. At step 518, computer system 10 exits the standby state. By this time, expansion unit 20 will have completed the connection or disconnection procedure. At step 520, computer system 10 resumes normal operations with a new configuration based on the addition or deletion of expansion unit 20.

Figure 6:
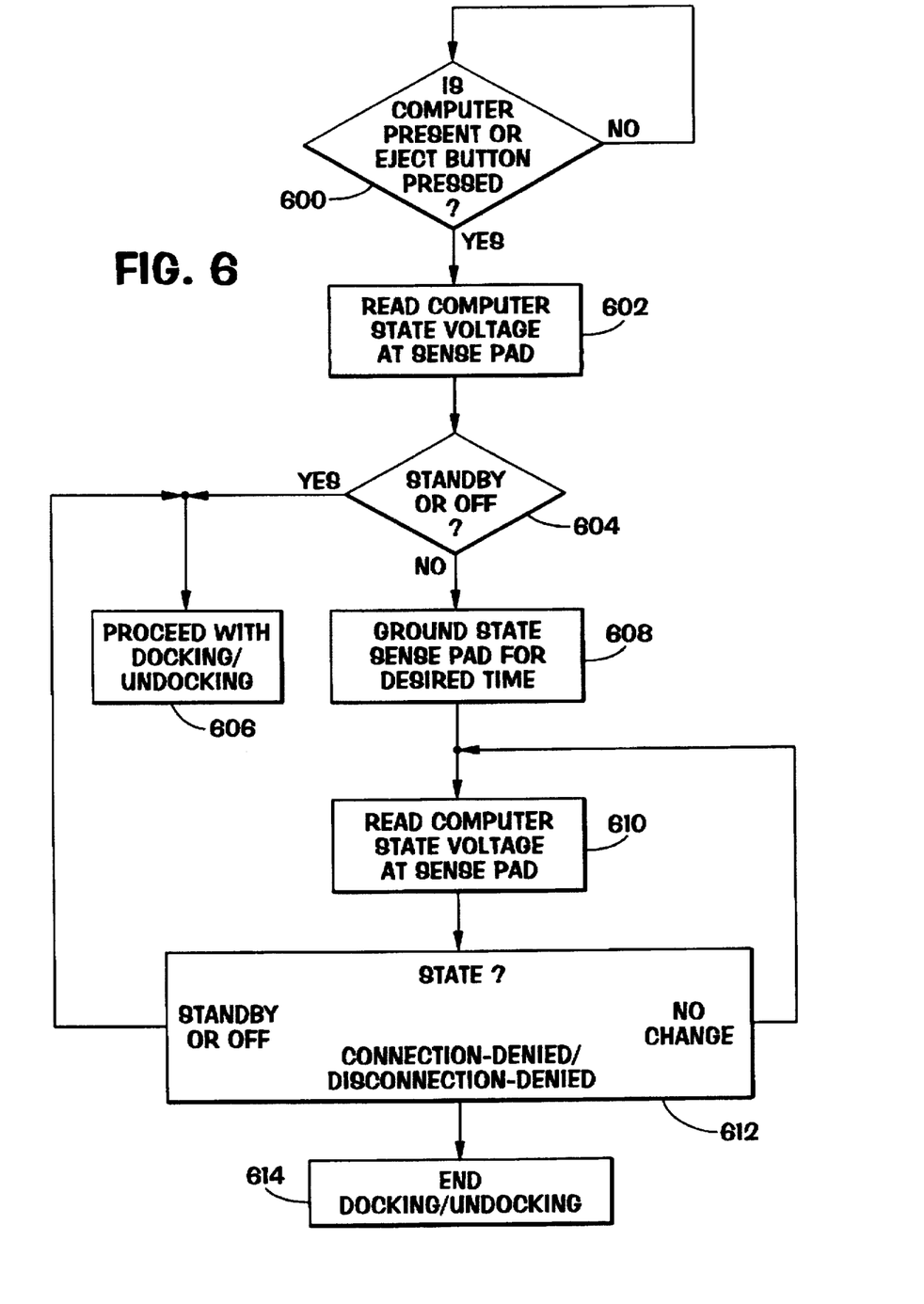
FIG. 6 is a flow chart of the sequence for an expansion base unit to connect with a computer system according to the present invention.

FIG. 6 is a flow chart of the procedure performed by expansion unit 20 when the user tries to place computer system 10 in expansion unit 20 or when the user tries to eject computer system 10 from expansion unit 20. At step 600, expansion unit 20 continuously checks to see if a computer is present by polling electrical sense pads 22, or expansion unit 20 continuously checks to see if an ejection signal has been generated from eject button 90 (FIG. 1). When a computer system 10 is finally present or eject button 90 is finally pressed to give an ejection signal, the computer state voltage is read from sense pads 22 at step 602. At step 604, microcontroller 66 determines if computer system 10 is in either the standby or off state. If computer system 10 is in one of these two states, then expansion unit 20 proceeds with the proper docking or undocking sequence at step 606. If computer system 10 is not in one of these two states, then microcontroller 66 returns a control signal to computer system 10 by grounding sense pads 22 for the desired time period at step 608. At step 610, expansion unit 20 returns to reading the state voltage at sense pads 22. At step 612, expansion unit 20 keeps looping back to step 610 until the state of computer system 10 changes to standby, off or connection-denied/disconnection-denied. If the state changes to standby or off, then expansion unit 20 proceeds with the proper docking or undocking sequence at step 606. If the state changes to connection-denied/disconnection-denied, on the other hand, then expansion unit 20 ends the docking or undocking procedure at step 614.

The person skilled in the art will recognize that the above embodiment of the invention is not the only possible embodiment. The communication between the computer system and the expansion unit could just as well have been done using infrared sensors or small RF sensors. Additionally, it will be readily apparent that the connection could have been made such that physical connection would be completed immediately, while the expansion port connector 28 would be electrically disabled until expansion unit 20 could detect that computer system 10 was in a proper state to complete the electrical connection.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. A method for use with a computer system having a RAM and a nonvolatile memory and a computer expansion unit for sensing and changing the state of the computer system before electrically connecting the computer system to the computer expansion unit comprising the steps of:

the computer system setting a state signal to an electrical sense pad attached to the computer system, said state signal indicative of a one of a plurality of states of the computer system;

placing the computer system in the computer expansion unit;

the computer expansion unit detecting said state signal from said electrical sense pad;

the computer expansion unit determining the state of the computer system from said detected state signal;

the computer expansion unit completing the electrical connection of the computer system to the computer expansion unit when said determined state of the computer system is a first state;

the computer expansion unit delaying the electrical connection of the computer system to the computer expansion unit when said determined state of the computer system is a second state;

the computer expansion unit sending a control signal to the computer system when said determined state of the computer system is said second state;

the computer system detecting said control signal;

the computer system saving the contents of the RAM to the nonvolatile memory;

the computer system changing its state to said first state on detecting said control signal; and the computer system resetting said state signal to said electrical sense pad to reflect said change of state to said first state.

2. The method of claim 1 wherein the step of the computer expansion unit delaying the electrical connection of the computer system to the computer expansion unit includes the step of the computer expansion unit preventing physical connection of the computer system to the computer expansion base.

3. The method of claim 2 wherein the step of the computer expansion unit completing the electrical connection of the computer system to the computer expansion unit includes the step of the computer expansion unit automatically making physical connection of the computer system with the computer expansion unit.

4. The method of claim 1 wherein:

the plurality of states of the computer system includes an always-connect state in which it is always permitted to electrically connect the computer system to the computer expansion unit immediately upon determination by said determining step that the computer system is in this state; and wherein said step of the computer expansion unit completing the electrical connection of the computer system to the computer expansion unit occurs when said determined state of the computer system is said always-connect state.

5. The method of claim 1 wherein:

the plurality of states of the computer system includes a wait-to-connect state in which it is permitted to electrically connect the computer system to the computer expansion unit after a delay period and wherein the method includes the further step of:

the expansion unit delaying the connection of the computer system to the expansion unit for a delay period; and said step of completing the electrical connection of the computer system to the computer expansion unit occurs when said determined state of the computer system is said wait-to-connect state.

6. The method of claim 1 wherein the plurality of states of the computer system includes an okay-to-connect state and a conditional-connection-denied state in which it is not permitted to connect the computer system to the computer expansion unit until the computer system changes its state to said okay-to-connect state and wherein:

said step of the computer expansion unit delaying the electrical connection and said step of the computer expansion unit sending said control signal occur when said determined state of the computer system is said conditional-connection-denied state;

said step of the computer system changing its state includes the further step of the computer system attempting to change its state to said okay-to-connect state; and upon a successful attempt to change the computer system's state to said okay-to-connect state, said step of the computer system resetting said state signal includes the further step of the computer system resetting said state signal to reflect said change of state to said okay-to-connect state.

7. The method of claim 6 wherein the plurality of states of the computer system includes a connection-denied state in which it is not permitted to connect the computer system to the computer expansion unit and wherein;

upon an unsuccessful attempt to change the computer system's state to said okay-to-connect state, the method includes the further step of the computer system changing its state to said connection-denied state; and said step of the computer system resetting said state signal includes the further step of the computer system resetting said state signal to reflect said change of state to said connection-denied state.

8. The method of claim 1 comprising the further steps of:

the computer expansion unit completing the electrical connection of the computer system to the computer expansion unit after the computer system resets said state signal to said electrical sense pad to reflect said change of state to said first state; and the computer system automatically returning itself to said second state.

9. An apparatus for sensing and changing the state of a computer system having a RAM and a nonvolatile memory before electrically connecting the computer system to a computer expansion unit comprising:

means within the computer system for setting a state signal to an electrical sense pad attached to the computer system, said state signal indicative of a one of a plurality of states of the computer system;

means within the computer expansion unit for detecting said state signal from said electrical sense pad when the computer system is placed in the computer expansion unit;

means within the computer expansion unit for determining the state of the computer system from said detected state signal;

means within the computer expansion unit for completing the electrical connection of the computer system to the computer expansion unit when said determined state of the computer system is a first state;

means within the computer expansion unit for delaying the electrical connection of the computer system to the computer expansion unit when said determined state of the computer system is a second state;

means within the computer expansion unit for saving a control signal to the computer system when said determined state of the computer system is said second state;

means within the computer system for detecting said control signal;

means within the computer system for saving the contents of the RAM to the nonvolatile memory;

means within the computer system for changing the computer system's state to said first state on detecting said control signal; and means within the computer system for resetting said state signal to said electrical sense pad to reflect said change of state to said first state.

10. The apparatus of claim 9 wherein the means for delaying the electrical connection of the computer system to the computer expansion unit includes a means for preventing physical connection of the computer system to the computer expansion base.

11. The apparatus of claim 10 wherein the means for completing the electrical connection of the computer system to the computer expansion unit includes a means for automatically making physical connection of the computer system with the computer expansion unit.

12. The apparatus of claim 9 wherein:

the plurality of states of the computer system includes an always-connect state in which it is always permitted to electrically connect the computer system to the computer expansion unit immediately upon determination by said means for determining that the computer system is in this state; and wherein said means for completing the electrical connection of the computer system to the computer expansion unit completes the electrical connection when said determined state of the computer system is said always-connect state.

13. The apparatus of claim 9 wherein the plurality of states of the computer system includes a wait-to-connect state in which it is permitted to electrically connect the computer system to the computer expansion unit after a delay period and wherein the apparatus further includes:

means within the expansion unit for delaying the connection of the computer system to the expansion unit for a delay period; and said means for completing the electrical connection of the computer system to the computer expansion unit completes the electrical connection when said determined state of the computer system is said wait-to-connect state.

14. The apparatus of claim 9 wherein the plurality of states of the computer system includes an okay-to-connect state and a conditional-connection-denied state in which it is not permitted to connect the computer system to the computer expansion unit until the computer system changes its state to said okay-to-connect state and wherein:

said means for delaying delays the electrical connection and said means for sending sends said control signal when said determined state of the computer system is said conditional-connection-denied state;

said means within the computer system for changing its state further includes a means for attempting to change the state of the computer system to said okay-to-connect state; and said means for resetting said state signal is capable of resetting said state signal to reflect said change of state to said okay-to-connect state responsive to a successful attempt by said attempting means to change the computer system's state to said okay-to-connect state.

15. The apparatus of claim 14 wherein the plurality of states of the computer system includes a connection-denied state in which it is not permitted to connect the computer system to the computer expansion unit and wherein the apparatus further includes:

means within the computer system for changing the state of the computer system to said connection-denied state responsive to an unsuccessful attempt by said attempting means to change the computer system's state to said okay-to-connect state; and said means for resetting said state signal is capable of resetting said state signal to reflect said change of state to said connection-denied state.

16. The apparatus of claim 9 further comprising:

means within the computer expansion unit for completing the electrical connection of the computer system to the computer expansion unit after the computer system resets said state signal to said electrical sense pad to reflect said change of state to said first state; and means within the computer system for automatically returning the computer system to said second state.

17. A method for use with a computer system having a RAM and a nonvolatile memory and a computer expansion unit for sensing and changing the state of the computer system before a user electrically connects the computer system to the computer expansion unit comprising the steps of:

the computer system setting a state signal to an electrical sense pad attached to the computer system, said state signal indicative of a one of a plurality of states of the computer system;

the user placing the computer system in the computer expansion unit;

the computer expansion unit detecting said state signal from said electrical sense pad;

the computer expansion unit determining the state of the computer system from said detected state signal;

the user completing the electrical connection of the computer system to the computer expansion unit when said determined state of the computer system is a first state;

the computer expansion unit blocking the electrical connection of the computer system to the computer expansion unit when said determined state of the computer system is a second state;

the computer expansion unit sending a control signal to the computer system when said determined state of the computer system is said second state;

the computer system detecting said control signal;

the computer system saving the contents of the RAM to the nonvolatile memory;

the computer system changing its state to said first state on detecting said control signal; and the computer system resetting said state signal to said electrical sense pad to reflect said change of state to said first state.

18. The method of claim 17 comprising the further steps of:

the user completing the electrical connection of the computer system to the computer expansion unit after the computer system resets said state signal to said electrical sense pad to reflect said change of state to said first state; and the computer system automatically returning itself to said second state.

19. An apparatus for sensing and changing the state of a computer system having a RAM and a nonvolatile memory before a user electrically connects the computer system to a computer expansion unit comprising:

means within the computer system for setting a state signal to an electrical sense pad attached to the computer system, said state signal indicative of a one of a plurality of states of the computer system;

means within the computer expansion unit for detecting said state signal from said electrical sense pad when the user places the computer system in the computer expansion unit;

means within the computer expansion unit for determining the state of the computer system from said detected state signal;

means for permitting the user to complete the electrical connection of the computer system to the computer expansion unit when said determined state of the computer system is a first state;

means within the computer expansion unit for blocking the electrical connection of the computer system to the computer expansion unit when said determined state of the computer system is a second state;

means within the computer expansion unit for sending a control signal to the computer system when said determined state of the computer system is said second state;

means within the computer system for detecting said control signal;

means within the computer system for saving the contents of the RAM to the nonvolatile memory;

means within the computer system for changing the computer system's state to said first state on detecting said control signal; and means within the computer system for resetting said state signal to said electrical sense pad to reflect said change of state to said first state.

20. The apparatus of claim 19 further comprising:

means within the computer expansion unit for permitting the user to complete the electrical connection of the computer system to the computer expansion unit after the computer system resets said state signal to said electrical sense pad to reflect said change of state to said first state; and means within the computer system for automatically returning the computer system to said second state.

21. A method for use with a computer system and a computer expansion unit for sensing and changing the state of the computer system before electrically disconnecting the computer system from the computer expansion unit comprising the steps of:

the computer system setting a state signal to an electrical sense pad attached to the computer system, said state signal indicative of a one of a plurality of states of the computer system;

receiving an ejection signal in the computer expansion unit;

the computer expansion unit detecting said state signal from said electrical sense pad;

the computer expansion unit determining the state of the computer system from said detected state signal;

the computer expansion unit completing the electrical disconnection of the computer system from the computer expansion unit when said determined state of the computer system is a first state;

the computer expansion unit delaying the electrical disconnection of the computer system from the computer expansion unit when said determined state of the computer system is a second state;

the computer expansion unit sending a control signal to the computer system when said determined state of the computer system is said second state;

the computer system detecting said control signal;

the computer system changing its state to said first state on detecting said control signal;

the computer system resetting said state signal to said electrical sense pad to reflect said change of state to said first state;

the computer expansion unit completing the electrical disconnection of the computer system from the computer expansion unit after the computer system resets said state signal to said electrical sense pad to reflect said change of state to said first state; and the computer system automatically returning itself to said second state.

22. The method of claim 21 wherein the step of the computer expansion unit delaying the electrical disconnection of the computer system from the computer expansion unit includes the step of the computer expansion unit preventing physical disconnection of the computer system from the computer expansion base.

23. The method of claim 22 wherein the step of the computer expansion unit completing the electrical disconnection of the computer system from the computer expansion unit includes the step of the computer expansion unit automatically making physical disconnection of the computer system from the computer expansion unit.

24. The method of claim 21 wherein:

the plurality of states of the computer system includes an always-disconnect state in which it is always permitted to electrically disconnect the computer system from the computer expansion unit immediately upon determination by said determining step that the computer system is in this state; and wherein said step of the computer expansion unit completing the electrical disconnection of the computer system from the computer expansion unit occurs when said determined state of the computer system is said always-disconnect state.

25. The method of claim 21 wherein:

the plurality of states of the computer system includes a wait-to-disconnect state in which it is permitted to electrically disconnect the computer system from the computer expansion unit after a delay period and wherein the method includes the further step of:

the expansion unit delaying the disconnection of the computer system from the expansion unit for a delay period; and said step of completing the electrical disconnection of the computer system from the computer expansion unit occurs when said determined state of the computer system is said wait-to-disconnect state.

26. The method of claim 21 wherein the plurality of states of the computer system includes an okay-to-disconnect state and a conditional-disconnection-denied state in which it is not permitted to disconnect the computer system from the computer expansion unit until the computer system changes its state to said okay-to-disconnect state and wherein:

said step of the computer expansion unit delaying the electrical disconnection and said step of the computer expansion unit sending said control signal occur when said determined state of the computer system is said conditional-disconnection-denied state;

said step of the computer system changing its state includes the further step of the computer system attempting to change its state to said okay-to-disconnect state; and upon a successful attempt to change the computer system's state to said okay-to-disconnect state, said step of the computer system resetting said state signal includes the further step of the computer system resetting said state signal to reflect said change of state to said okay-to-disconnect state.

27. The method of claim 26 wherein the plurality of states of the computer system includes a disconnection-denied state in which it is not permitted to disconnect the computer system from the computer expansion unit and wherein;

upon an unsuccessful attempt to change the computer system's state to said okay-to-disconnect state, the method includes the further step of the computer system changing its state to said disconnection-denied state; and said step of the computer system resetting said state signal includes the further step of the computer system resetting said state signal to reflect said change of state to said disconnection-denied state.

28. An apparatus for sensing and changing the state of a computer system before electrically disconnecting the computer system from a computer expansion unit comprising:

means within the computer system for setting a state signal to an electrical sense pad attached to the computer system, said state signal indicative of a one of a plurality of states of the computer system;

means for generating an ejection signal within the computer expansion unit;

means within the computer expansion unit for detecting said state signal from said electrical sense pad when said ejection signal is generated within the computer expansion unit;

means within the computer expansion unit for determining the state of the computer system from said detected state signal;

means within the computer expansion unit for completing the electrical disconnection of the computer system from the computer expansion unit when said determined state of the computer system is a first state;

means within the computer expansion unit for delaying the electrical disconnection of the computer system from the computer expansion unit when said determined state of the computer system is a second state;

means within the computer expansion unit for sending a control signal to the computer system when said determined state of the computer system is said second state;

means within the computer system for detecting said control signal;

means within the computer system for changing the computer system's state to said first state on detecting said control signal;

means within the computer system for resetting said state signal to said electrical sense pad to reflect said change of state to said first state;

means within the computer expansion unit for completing the electrical disconnection of the computer system from the computer expansion unit after the computer system resets said state signal to said electrical sense pad to reflect said change of state to said first state; and means within the computer system for automatically returning the computer system to said second state.

29. The apparatus of claim 28 wherein the means for delaying the electrical disconnection of the computer system from the computer expansion unit includes a means for preventing physical disconnection of the computer system from the computer expansion base.

30. The apparatus of claim 29 wherein the means for completing the electrical disconnection of the computer system from the computer expansion unit includes a means for automatically making physical disconnection of the computer system from the computer expansion unit.

31. The apparatus of claim 28 wherein:

the plurality of states of the computer system includes an always-disconnect state in which it is always permitted to electrically disconnect the computer system from the computer expansion unit immediately upon determination by said means for determining that the computer system is in this state; and wherein said means for completing the electrical disconnection of the computer system from the computer expansion unit completes the electrical disconnection when said determined state of the computer system is said always-disconnect state.

32. The apparatus of claim 28 wherein the plurality of states of the computer system includes a wait-to-disconnect state in which it is permitted to electrically disconnect the computer system from the computer expansion unit after a delay period and wherein the apparatus further includes:

means within the expansion unit for delaying the disconnection of the computer system to the expansion unit for a delay period; and said means for completing the electrical disconnection of the computer system from the computer expansion unit completes the electrical disconnection when said determined state of the computer system is said wait-to-disconnect state.

33. The apparatus of claim 28 wherein the plurality of states of the computer system includes an okay-to-disconnect state and a conditional-disconnection-denied state in which it is not permitted to disconnect the computer system from the computer expansion unit until the computer system changes its state to said okay-to-disconnect state and wherein:

said means for delaying delays the electrical disconnection and said means for sending sends said control signal when said determined state of the computer system is said conditional-disconnection-denied state;

said means within the computer system for changing its state further includes a means for attempting to change the state of the computer system to said okay-to-disconnect state; and said means for resetting said state signal is capable of resetting said state signal to reflect said change of state to said okay-to-disconnect state responsive to a successful attempt by said attempting means to change the computer system's state to said okay-to-disconnect state.

34. The apparatus of claim 33 wherein the plurality of states of the computer system includes a disconnection-denied state in which it is not permitted to disconnect the computer system from the computer expansion unit and wherein the apparatus further includes;

means within the computer system for changing the state of the computer system to said disconnection-denied state responsive to an unsuccessful attempt by said attempting means to change the computer system's state to said okay-to-disconnect state; and said means for resetting said state signal is capable of resetting said state signal to reflect said change of state to said disconnection-denied state.

35. A method for use with a computer system and a computer expansion unit for sensing and changing the state of the computer system before a user electrically disconnects the computer system from the computer expansion unit comprising the steps of:

the computer system setting a state signal to an electrical sense pad attached to the computer system, said state signal indicative of a one of a plurality of states of the computer system;

the user generating an ejection signal in the computer expansion unit;

the computer expansion unit detecting said state signal from said electrical sense pad;

the computer expansion unit determining the state of the computer system from said detected state signal;

the user completing the electrical disconnection of the computer system from the computer expansion unit when said determined state of the computer system is a first state;

the computer expansion unit blocking the electrical disconnection of the computer system from the computer expansion unit when said determined state of the computer system is a second state;

the computer expansion unit sending a control signal to the computer system when said determined state of the computer system is said second state;

the computer system detecting said control signal;

the computer system changing its state to said first state on detecting said control signal;

the computer system resetting said state signal to said electrical sense pad to reflect said change of state to said first state;

the computer expansion unit completing the electrical disconnection of the computer system from the computer expansion unit after the computer system resets said state signal to said electrical sense pad to reflect said change of state to said first state; and the computer system automatically returning itself to said second state.

36. An apparatus for sensing and changing the state of a computer system before a user electrically disconnects the computer system from a computer expansion unit comprising:

means within the computer system for setting a state signal to an electrical sense pad attached to the computer system, said state signal indicative of a one of a plurality of states of the computer system;

means for the user generating an ejection signal;

means within the computer expansion unit for detecting said state signal from said electrical sense pad when the user generates said ejection signal in the computer expansion unit;

means within the computer expansion unit for determining the state of the computer system from said detected state signal;

means for permitting the user to complete the electrical disconnection of the computer system from the computer expansion unit when said determined state of the computer system is a first state;

means within the computer expansion unit for blocking the electrical disconnection of the computer system from the computer expansion unit when said determined state of the computer system is a second state;

means within the computer expansion unit for sending a control signal to the computer system when said determined state of the computer system is said second state;

means within the computer system for detecting said control signal;

means within the computer system for changing the computer system's state to said first state on detecting said control signal;

means within the computer system for resetting said state signal to said electrical sense pad to reflect said change of state to said first state;

means within the computer expansion unit for completing the electrical disconnection of the computer system from the computer expansion unit after the computer system resets said state signal to said electrical sense pad to reflect said change of state to said first state; and means within the computer system for automatically returning the computer system to said second state.

\* \* \* \* \*